United States Patent
Kim et al.

(10) Patent No.: US 10,966,106 B2
(45) Date of Patent: Mar. 30, 2021

(54) METHOD AND APPARATUS FOR MANAGING A PDN CONNECTION IN A WIRELESS COMMUNICATION SYSTEM

(71) Applicant: Samsung Electronics Co., Ltd., Suwon-si (KR)

(72) Inventors: Bokkeun Kim, Seoul (KR); Jaehyun Park, Yongin-si (KR); Weyoung Yoon, Suwon-si (KR); Sujeong Lee, Suwon-si (KR); Sungmo Jung, Suwon-si (KR); Hangsuk Huh, Seongnam-si (KR); Kyupyo Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 112 days.

(21) Appl. No.: 16/146,626

(22) Filed: Sep. 28, 2018

(65) Prior Publication Data
US 2019/0104425 A1 Apr. 4, 2019

(30) Foreign Application Priority Data

Sep. 29, 2017 (KR) .................. 10-2017-0128276

(51) Int. Cl.
*H04W 24/04* (2009.01)
*H04W 76/19* (2018.01)
*H04W 76/18* (2018.01)
*H04W 76/34* (2018.01)
*H04W 60/06* (2009.01)

(52) U.S. Cl.
CPC .......... *H04W 24/04* (2013.01); *H04W 60/06* (2013.01); *H04W 76/18* (2018.02); *H04W 76/19* (2018.02); *H04W 76/34* (2018.02)

(58) Field of Classification Search
None
See application file for complete search history.

(56) References Cited

U.S. PATENT DOCUMENTS

| | | | |
|---|---|---|---|
| 9,088,586 B2 | 7/2015 | Jun et al. | |
| 9,277,462 B1* | 3/2016 | Ramamurthy | .... H04W 36/0038 |
| 2009/0262736 A1* | 10/2009 | Zhao | ...... H04W 76/32 370/389 |
| 2010/0081393 A1* | 4/2010 | Huang | .... H04W 4/20 455/68 |

(Continued)

FOREIGN PATENT DOCUMENTS

WO 2009129248 A1 10/2009

OTHER PUBLICATIONS

European Patent Office, "European Search Report," Application No. EP18197744.8, dated Mar. 4, 2019, 7 pages.

(Continued)

*Primary Examiner* — Adnan Baig

(57) ABSTRACT

The present disclosure relates to a method and an apparatus for managing a PDN connection by inducing, by a node, a terminal to autonomously recover a failure situation or detecting the corresponding terminal when the terminal is not capable of generating or maintaining the PDN connection in a wireless communication system and the method of the present disclosure includes: detecting, by a node, a terminal in which a failure occurs in a PDN connection; and transmitting a detach request message to the terminal in which the failure occurs.

16 Claims, 12 Drawing Sheets

(56) References Cited

U.S. PATENT DOCUMENTS

| | | | |
|---|---|---|---|
| 2014/0254363 A1* | 9/2014 | Tanaka | H04W 28/0226 |
| | | | 370/230 |
| 2015/0117184 A1* | 4/2015 | Youtz | H04W 76/18 |
| | | | 370/230 |
| 2016/0105412 A1* | 4/2016 | Shen | H04W 12/0806 |
| | | | 726/4 |
| 2017/0099619 A1 | 4/2017 | Yin et al. | |
| 2017/0201902 A1* | 7/2017 | Chen | H04W 28/0215 |
| 2018/0049024 A1* | 2/2018 | Schliwa-Bertling | H04W 8/30 |
| 2019/0215762 A1* | 7/2019 | Kim | H04W 76/30 |

OTHER PUBLICATIONS

Kumar Swamy Pasupuleti, "Detach Request (Network Initiated)," How LTE Stuff Words blog post, Dec. 16, 2011, 3 pages, XP055559939, http://howltestuffworks.blogspot.com/2011/12/detach-request-network-initiated.html.

* cited by examiner

METHOD AND APPARATUS FOR MANAGING A PDN CONNECTION IN A WIRELESS COMMUNICATION SYSTEM

CROSS-REFERENCE TO RELATED APPLICATION

This application is based on and claims priority under 35 U.S.C. § 119 to Korean Patent Application No. 10-2017-0128276 filed on Sep. 29, 2017 in the Korean Intellectual Property Office, the disclosure of which is incorporated by reference herein in its entirety.

BACKGROUND

1. Field

Various embodiments of the present disclosure relate to a wireless communication system, and more particularly, to a method and an apparatus for managing a PDN connection in a wireless communication system.

2. Description of Related Art

Generally, mobile communication systems have been developed to provide a voice service while securing activity of a user. However, the mobile communication system gradually extends an area from a voice service to a data service. At present, the mobile communication system has been developed to provide a high-speed data service. However, since the current mobile communication systems that are providing services suffers from a resource shortage phenomenon and do not meet a user demand for higher-speed services, there is a need for a more developed mobile communication system.

To meet the requirement, standardizations for long term evolution (LTE) in the 3rd generation partnership project (3GPP) as one system that is being developed as next-generation mobile communication systems are in progress. The LTE is a technology of implementing fast packet based communication having a transmission rate up to 100 Mbps or so, with aiming to commercialize around 2010. For this purpose, several schemes have been discussed. For example, there are a scheme of reducing the number of nodes positioned on a communication path by simplifying network architecture, a scheme of approaching radio protocols to a radio channel to the extent possible, and so on.

Meanwhile, generation of all packet data networks (PDNs) is triggered by a terminal, and there is no procedure for triggering the PDN generation of the terminal in a core network. Since all PDN connection generation is triggered by the terminal, the terminal generally generates all PDNs to be served as soon as the terminal attaches the PDN with a PDN connectivity procedure.

However, when the terminal does not generate a specific PDN connection due to malfunction of the terminal, in a case where downlink traffic occurs, there is no method to transmit the downlink traffic from the core network to the terminal, so that a problem may occur, in which the corresponding service cannot be received until the terminal autonomously generates the PDN connection for another reason, and as a result, a discussion for solving the problem is required.

SUMMARY

The present disclosure is contrived to solve the problem and an object of the present disclosure is to provide a method and an apparatus for managing a PDN connection in a wireless communication system.

In order to solve the problem, a method for managing a packet data network (PDN) connection of a node in a wireless communication system of the present disclosure comprises: detecting, by a node, a terminal in which a failure occurs in a PDN connection; and transmitting a detach request message to the terminal in which the failure occurs.

Further, a node for managing a packet data network (PDN) connection in a wireless communication system of the present disclosure comprises: a transceiver configured to transmit and receive information on a PDN connection management to and from a terminal; a controller configured to detect a terminal in which a failure occurs in the PDN connection by the node and transmit a detach request message to the terminal in which the failure occurs; and a storage configured to store information on the terminal in which the failure occurs and the retry count of trying reattach by the terminal in the node.

In addition, a method for managing a packet data network (PDN) connection of a terminal in a wireless communication system of the present disclosure comprises: receiving, by a terminal in which a failure occurs in a PDN connection between a terminal and a PDN, a detach request message from a node; performing, by the terminal, detach; and attaching the terminal.

In addition, a terminal for managing a packet data network (PDN) connection in a wireless communication system of the present disclosure comprises: a transceiver configured to transmit and receive information on a PDN connection management to and from a node; and a controller configured to receive a detach request message from the node by the terminal and perform detach and attach.

According to the present disclosure, a terminal that does not generate a PDN connection for a specific service or releases the PDN connection is reattached to a network (a procedure in which the terminal is detached and reattach required is given to detach type to induce the terminal to be attached again) to induce the terminal to autonomously request the corresponding PDN connection generation again and detect terminals in which the PDN connection is not restored even though Reattach is repeated, and as a result, when the downlink traffic occurs due to no PDN connection, a problem that the downlink traffic may not be transmitted to the terminal can be solved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
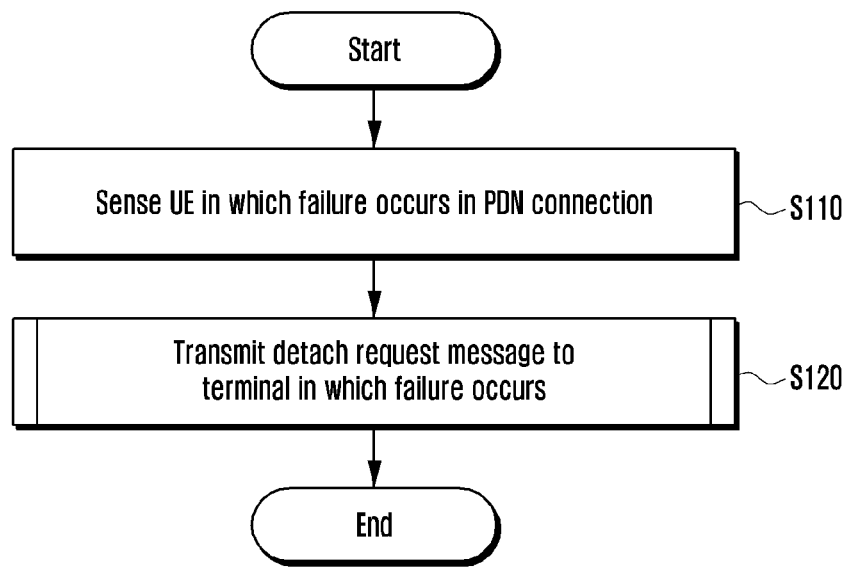
FIG. 1 illustrates a flowchart of an operation flow in which an MME manages a PDN connection according to an embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect a real size of each component. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s).

Further, it is to be noted that functions mentioned in the blocks occur regardless of a sequence in some alternative embodiments. For example, two blocks that are consecutively illustrated may be substantially simultaneously performed in fact or be performed in a reverse sequence depending on corresponding functions sometimes.

Here, the term "~unit" used in the present embodiment means software or hardware components such as FPGA and ASIC and the '~unit' performs any roles. However, the meaning of the "~unit" is not limited to software or hardware. The "~unit" may be configured to be in a storage medium that may be addressed and may also be configured to reproduce one or more processors. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may be further separated into additional components and "~units." In addition, the components and the "~units" may also be implemented to reproduce one or more CPUs within a device or a security multimedia card.

Hereinafter, a method for detecting a terminal that may not generate or maintain a PDN connection by managing a PDN connection by an arbitrary node in a wireless communication system will be described. In this case, the node may induce the terminal to recover a failure situation.

In addition, a method for detecting a terminal in which a failure occurs in the PDN connection according to an embodiment of the present disclosure will be described separately in first and second embodiments.

The present disclosure relates to a method in which an arbitrary node positioned in a core network manages the PDN connection and in the following embodiment, it is assumed and described that a mobility management entity (MME) carries out the embodiment of the present disclosure described below. However, the node need not be particularly limited to the MME and it may be noted that it is not excluded that other core network nodes including packet data network gateway (P-GW), serving gateway (SGW), and the like carry out the following embodiment.

FIG. 1 illustrates a flowchart of an operation in which an MME manages a PDN connection in a wireless communication system, applied to an embodiment of the present disclosure.

Prior to the description of FIG. 1, the terminal may transmit an attach request message to the MME for an initial connection. Thereafter, the PDN connection may be generated between the terminal and the PDN under the control of the MME.

According to an embodiment of the present disclosure, since the MME may detect whether the failure occurs by monitoring the PDN connection even after an initial connection for management of the PDN connection, it will be described below.

According to an embodiment of the present disclosure, in step S110, the MME may monitor the PDN connection between the terminal and the packet data network (PDN) to detect a terminal in which the failure occurs in the PDN connection. The MME may confirm whether the PDN connection to the terminal is normally generated and whether the generated PDN connection is maintained.

In addition, the PDN connection failure may include a case where the PDN connection for a service requested to the terminal is not generated or the PDN connection is released after the PDN connection is established and the service requested to the terminal may not be provided.

Further, in step S120, the MME may transmit a detach request message to the terminal in which the failure occurs. The MME may set a detach type of detach request message to be transmitted to the terminal to Reattach Required. A specific operation in which the MME transmits the detach request message to the terminal in which the failure occurs will be described below with reference to FIG. 6.

When the terminal receives the detach request message, the terminal may perform a detach procedure. Then, as a detach type of the detach request message is set to Reattach Required, the terminal attempts to attach to the MME again and requests the corresponding PDN connection generation.

Through the process illustrated in FIG. 1, the MME may induce or trigger the terminal in which the failure occurs in the PDN connection to autonomously recover the PDN connection.

Embodiments that detect the terminal in which the failure occurs in the PDN connection will be described through FIGS. 2 and 4 below.

Figure 2:
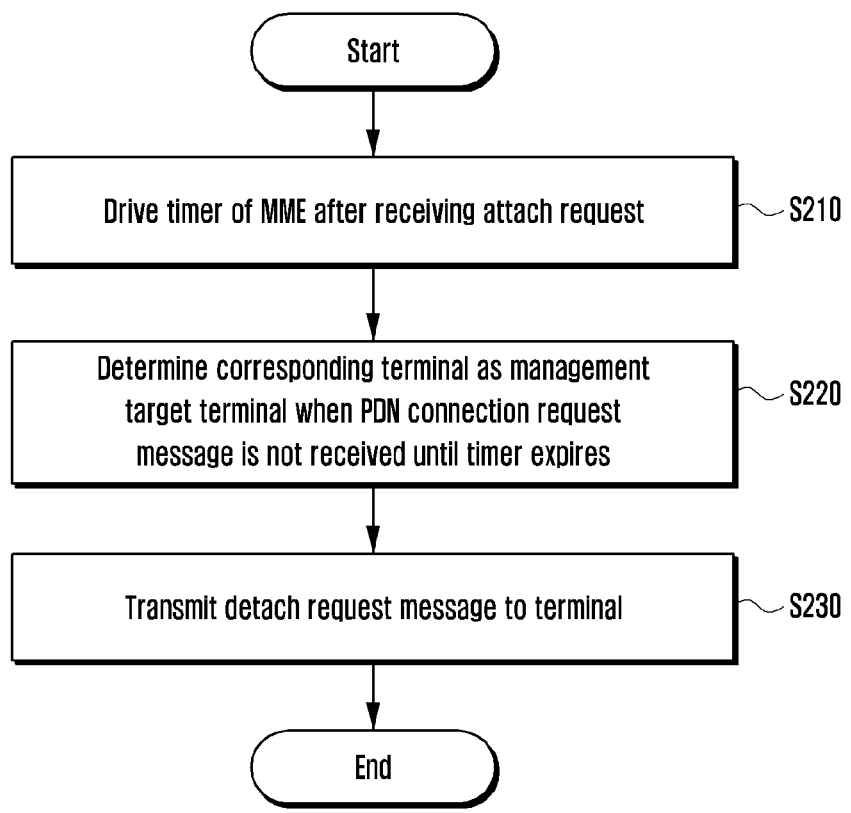
FIG. 2 illustrates a flowchart of a process in which the MME manages a PDN connection according to a first embodiment of the present disclosure.

FIG. 2 illustrates a flowchart of a process in which the MME manages a PDN connection according to a first embodiment of the present disclosure.

First, when the terminal completes the attach before step S210, the terminal may trigger and generate the PDN connection for the service requested to the terminal including a default PDN connection.

In addition, when the MME receives the attach request message from the terminal in step S210, the MME may start a timer. The MME may detect whether the failure occurs in the PDN connection between the terminal and the PDN.

As illustrated in FIG. 1, the MME may confirm whether a situation occurs in which the terminal may not generate the PDN connection for the service requested to the terminal. Alternatively, the MME may confirm whether a situation occurs in which the PDN connection is released and the service requested to the terminal is not provided after the terminal generates the PDN connection.

Meanwhile, the PDN connection may not be generated for various reasons. In the first embodiment of the present disclosure, it is assumed that the PDN connection is not generated because the terminal does not transmit a PDN Connectivity Request message to the MME.

In addition, in step S220, when the MME does not receive the PDN connection request message for the service requested to the terminal until the timer expires, the MME may determine the terminal as a management target terminal.

A method for distinguishing whether the service is requested to the terminal is as follows. First, the MME may distinguish the service by an access point name (APN). Examples of the APN include internet APN, ims APN, emergency APN, iot APN, and the like.

Second, the MME may distinguish the service according to a preset QoS class identifier (QCI). Since the QCI value may vary depending on the type of service and the MME may know the service according to the QCI value in advance, the MME may distinguish whether the service is requested to the terminal.

Third, the MME may distinguish the service according to whether to transmit an emergency. The terminal transmits whether there is the emergency together with at the time of requesting PDN connectivity. Based thereon, the MME may distinguish whether there is an emergency service.

Fourth, the MME may distinguish the service according to allocation and retention priority (ARP) information which is QoS parameters including priority level, aggregate maximum bit rate, pre-emption vulnerability, pre-emption capability, etc.

In addition, in step S230, the MME may transmit the detach request message to the terminal determined as the management target terminal. Since the detach request message includes information for reattach of the terminal, the detach request message may induce the terminal to generate the PDN connection.

Through the process, the terminal determined as the management target terminal may operate as a normal terminal by recovering the PDN connection.

Figure 3:
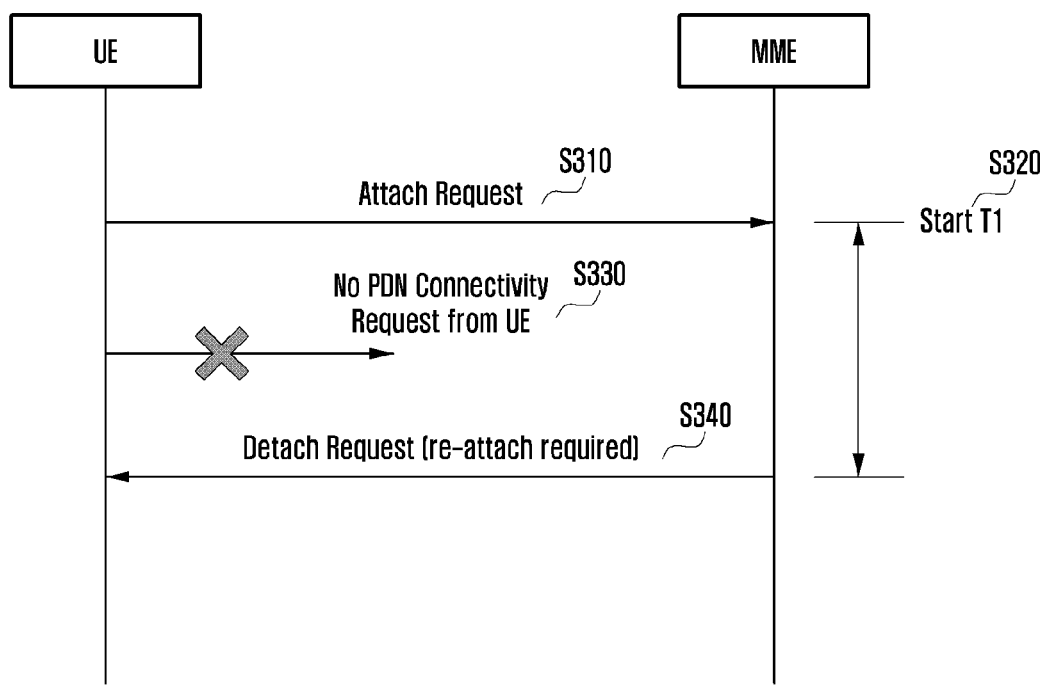
FIG. 3 illustrates a diagram of a process in which the MME and a terminal manage the PDN connection according to the first embodiment of the present disclosure.

FIG. 3 illustrates a diagram of a process in which the MME and a terminal manage the PDN connection according to the first embodiment of the present disclosure.

In step S310, when the terminal transmits the attach request to the MME, the PDN connection between the terminal and the PDN may be generated under the control of the MME. In addition, in step S320, when the MME receives the attach request message from the terminal, the MME may start the timer. The timer may be a locally configured timer in the MME.

In addition, in step S330, when the MME does not receive the PDN connection request message for the service requested to the terminal until the timer expires, the MME may determine the terminal as the management target terminal. In addition, in step S340, the MME may transmit the detach request message to the management target terminal. The management target terminal may be a terminal detected as the terminal in which the failure occurs in the PDN connection.

In addition, the MME may determine whether the failure occurs in the PDN connection until the timer expires based on whether the MME receives the PDN connection request message for the service requested to the corresponding terminal.

Figure 4:
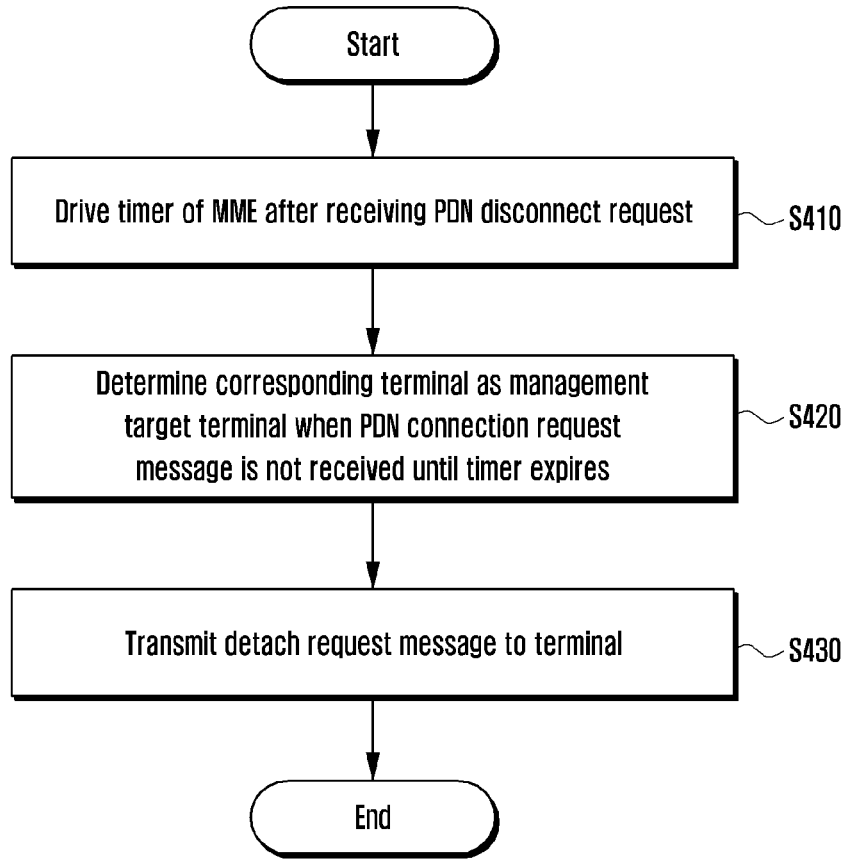
FIG. 4 illustrates a flowchart of a process in which an MME manages a PDN connection according to a second embodiment of the present disclosure.

FIG. 4 illustrates a flowchart of a process in which an MME manages a PDN connection according to a second embodiment of the present disclosure.

First, when the terminal completes the attach before step S410, the terminal may trigger and generate the PDN connection for the service requested to the terminal including the default PDN connection. In addition, only when the PDN connection is maintained, the terminal may receive the service. When the PDN connection is disconnected, the terminal may transmit the PDN connection request message to the MME.

In addition, when the MME receives a PDN Disconnect Request message of the PDN connection for the service requested to the terminal in step S410, the MME may start the timer. The MME may detect whether the failure occurs in the PDN connection between the terminal and the PDN.

As illustrated in FIG. 1, the MME may confirm whether a situation occurs in which the terminal may not generate the PDN connection for the service requested to the terminal. Alternatively, the MME may confirm whether a situation occurs in which the PDN connection is released and the service requested to the terminal is not provided after the terminal generates the PDN connection.

Meanwhile, the PDN connection may be disconnected due to various reasons. In the second embodiment of the present disclosure, it is assumed that the PDN connection is disconnected by transmitting the PDN disconnect request message by the terminal to the MME.

Further, a method for distinguishing whether the service is requested to the terminal is as follows. First, the MME may distinguish the service by an access point name (APN). Examples of the APN include internet APN, ims APN, emergency APN, iot APN, and the like.

Second, the MME may distinguish the service according to a preset QoS class identifier (QCI). Since the QCI value may vary depending on the type of service and the MME may know the service according to the QCI value in advance, the MME may distinguish whether the service is requested to the terminal.

Third, the MME may distinguish the service according to whether to transmit an emergency. The terminal transmits whether there is the emergency together with at the time of requesting PDN connectivity. Based thereon, the MME may distinguish whether there is an emergency service.

Fourth, the MME may distinguish the service according to allocation and retention priority (ARP) information which is QoS parameters including priority level, aggregate maximum bit rate, pre-emption vulnerability, pre-emption capability, etc.

In addition, in step S420, when the MME does not receive the PDN connection request message for the service requested to the terminal until the timer expires, the MME may determine the terminal as a management target terminal.

In addition, in step S430, the MME may transmit the detach request message to the terminal determined as the management target terminal. Since the detach request message includes information for reattach of the terminal, the detach request message may induce the terminal to generate the PDN connection.

Through the process, the terminal determined as the management target terminal may operate as a normal terminal by recovering the PDN connection.

Figure 5:
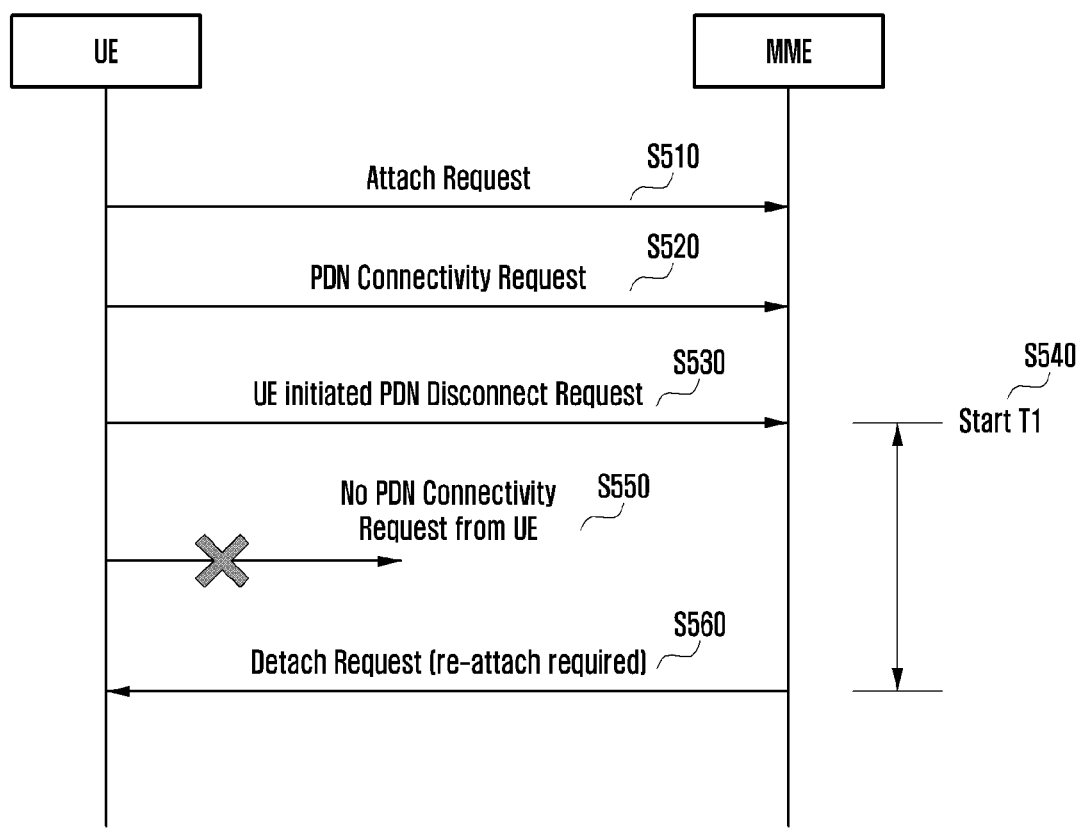
FIG. 5 illustrates a diagram of a process in which the MME and a terminal manage the PDN connection according to the second embodiment of the present disclosure.

FIG. 5 illustrates a diagram of a process in which the MME and a terminal manage the PDN connection according to the second embodiment of the present disclosure.

First, in step S510, the terminal may transmit the attach request message to the MME. In addition, in step S520, the terminal may transmit a PDN Connectivity Request message to the MME.

Meanwhile, in step S530, when the terminal transmits the PDN disconnect request to the MME, the PDN connection generated for the terminal may be disconnected. In addition, in step S540, when the MME receives the PDN Disconnect Request message of the PDN connection for the service requested to the terminal, the MME may start the timer. The timer may be a locally configured timer in the MME.

In addition, in step S550, when the MME does not receive the PDN connection request message for the service requested to the terminal until the timer expires, the MME may determine the terminal as the management target terminal. In addition, in step S560, the MME may transmit the detach request message to the management target terminal. The management target terminal may be a terminal detected as the terminal in which the failure occurs in the PDN connection.

In addition, the MME may determine whether the failure occurs in the PDN connection until the timer expires based on whether the MME receives the PDN connection request message for the service requested to the corresponding terminal.

Figure 6:
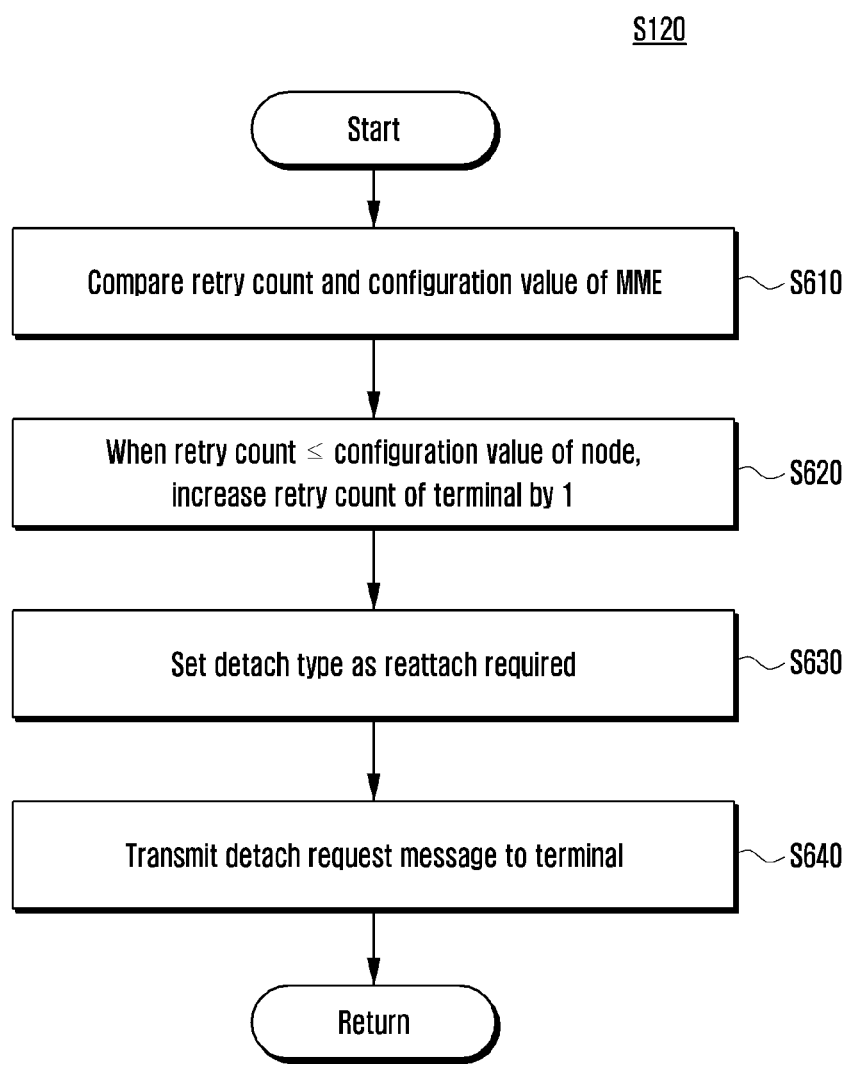
FIG. 6 illustrates a flowchart of a detach request message transmitting step according to an embodiment of the present disclosure.

FIG. 6 illustrates a flowchart of a detach request message transmitting step according to an embodiment of the present disclosure.

Specifically, FIG. 6 illustrates a flowchart of a specific process of transmitting the detach request message in step S120 of FIG. 1.

First, in step S610, the MME may compare a retry count of trying the reattach by the terminal and a configuration value of the MME. The retry count may mean the number of times of performing the reattach by the corresponding terminal according to an embodiment of the present disclosure. For example, the reattach may mean that the terminal is attached to the MME again after detach according to the detach request of the MME.

The retry count may be stored in subscriber information of each terminal at the time of performing the reattach and the MME may confirm the number of times of performing the reattach by the terminal. When the terminal performs the detach, the number of times of performing the reattach may be increases by 1 and when the detach is not performed, the number of times of performing the reattach may not be increased.

In addition, when the terminal is powered off and the terminal is detached, the MME may initialize the retry count to zero. When the power source is terminated, the user of the terminal may determine that the user of the terminal manually powers on and off the terminal because the terminal does not operate. In the above case, the MME may initialize the retry count to zero. Thereafter, the MME may use the PDN connection management method again to the terminal according to an embodiment of the present disclosure.

In addition, in step S620, when the retry count of trying the reattach by the terminal is equal to or less than a configuration value of the MME, the MME may increase the retry count of trying the reattach by the terminal by 1.

The reason for managing the retry count is that when the terminal infinitely repeats the reattach, a load of the MME may increase and further, even when the terminal repeats the reattach, terminal is intended to be selected, in which the PDN connection is not recovered.

In addition, in step S630, the MME may set the detach type of the detach request message to be the reattach required. With respect to a terminal to be managed, when the retry count is equal to or less than a configured value of the MME, the MME may trigger the detach of the terminal. In this case, the MME may set the detach type to reattach required, and as a result, it is possible to derive the reattach of the terminal.

In addition, in step S640, the MME may transmit the detach request message to the terminal. When the terminal receives the detach request message, the terminal may perform the detach procedure. Then, as a detach type of the detach request message is set to reattach required, the terminal attempts to attach to the MME again and requests the corresponding PDN connection generation. Through the PDN connection management process according to an embodiment of the present disclosure, the MME may induce or trigger the terminal in which the failure occurs in the PDN connection to autonomously recover the PDN connection.

Figure 7:
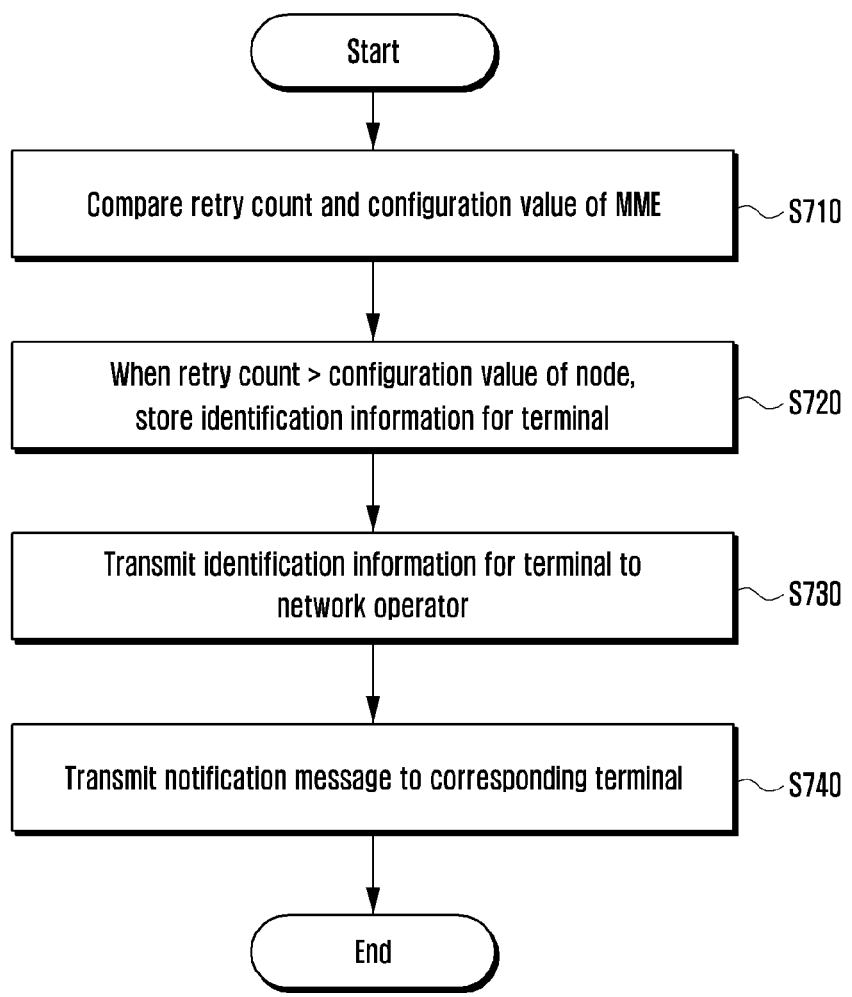
FIG. 7 illustrates a flowchart of a method for managing terminals in which a PDN connection is not recovered according to an embodiment of the present disclosure.

Meanwhile, FIG. 7 illustrates a flowchart of a management step for irrecoverable terminals in which a PDN connection is not recovered according to an embodiment of the present disclosure. Specifically, FIG. 7 illustrates a flowchart of a specific process of managing the terminals which are not recovered through the process of FIG. 6.

First, in step S710, the MME may compare a retry count of trying the reattach by the terminal and a configuration value of the MME. The retry count may mean the number of times of performing the reattach by the corresponding terminal according to an embodiment of the present disclosure. For example, the reattach may mean that the terminal is attached to the MME again after detach according to the detach request of the MME.

The retry count may be stored in subscriber information of each terminal at the time of performing the reattach and the MME may confirm the number of times of performing the reattach by the terminal. When the terminal performs the detach, the number of times of performing the reattach may be increases by 1 and when the detach is not performed, the number of times of performing the reattach may not be increased.

In addition, when the terminal is powered off and the terminal is detached, the MME may initialize the retry count to zero. When the power source is terminated, the user of the terminal may determine that the user of the terminal manually powers on and off the terminal because the terminal does not operate. In the above case, the MME may initialize the retry count to zero. Thereafter, the MME may use the PDN connection management method again to the terminal according to an embodiment of the present disclosure.

In addition, in step S720, when the retry count of trying the reattach by the terminal is larger than a configuration value of the MME, the MME may not transmit the detach request message to the terminal.

In this case, the MME may classify the terminal as the terminal in which the PDN connection may not be recovered and store identification information for the terminal in a storage of the MME. Since it is highly possible that the failure of the PDN connection is due to a defect of the terminal itself rather than a problem of a communication network, the MME may store the identification information to identify the corresponding terminal.

In addition, the MME inquires subscriber information using the retry count value for all terminals in the MME, thereby identifying the terminal in which the failure occurs in the PDN connection or the terminal in which the PDN connection may not be recovered.

In step S730, the MME may transmit the identification information for the terminal to a network operator. The identification information for the terminal may be an international mobile equipment identity (IMEI) and an international mobile subscriber identity (IMSI). The network operator receiving the IMEI/IMSI information may identify abnormal terminals.

In addition, in step S740, the MME may transmit a notification message to the corresponding terminal. The terminal receiving the notification message may have the defect in the terminal itself. Therefore, the MME may transmit the notification message to inform the user of the terminal. As a method of transmitting the notification message, a pop-up message of a communication company application, SMS, or the like may be utilized.

Figure 8A:
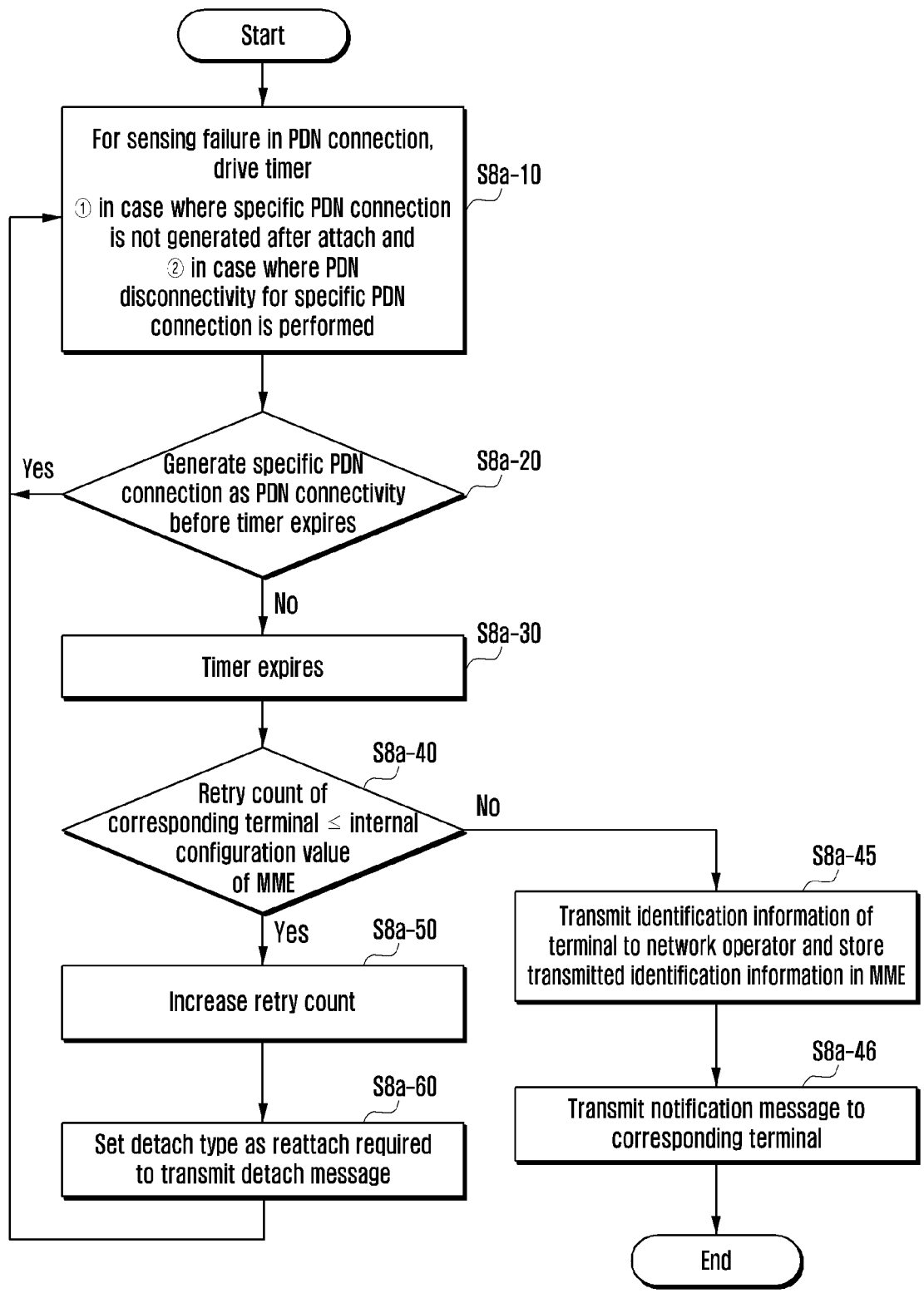
FIG. 8A illustrates a flowchart of a method for managing a PDN connection according to an embodiment of the present disclosure.

FIG. 8A illustrates a flowchart of a method for managing a PDN connection according to an embodiment of the present disclosure.

First, the MME monitors the PDN connection between the terminal and the PDN to detect whether the failure occurs in the PDN connection. The MME may confirm whether the PDN connection to the terminal is normally generated and whether the generated PDN connection is maintained.

In addition, in step S8A-10, the MME may detect whether the failure occurs in the PDN connection between the terminal and the PDN and start the timer. The case where the MME detects that the failure occurs may include a case where the PDN connection for the service requested to the terminal is not generated according to the first embodiment of the present disclosure or a case where the terminal transmits the PDN disconnect request to the MME with respect to the PDN connection for the service requested to the terminal according to the second embodiment of the present disclosure.

Further, a method for distinguishing whether the service is requested to the terminal is as follows. First, the MME may distinguish the service by an access point name (APN). Examples of the APN include internet APN, ims APN, emergency APN, iot APN, and the like.

Second, the MME may distinguish the service according to a preset QoS class identifier (QCI). Since the QCI value may vary depending on the type of service and the MME may know the service according to the QCI value in advance, the MME may distinguish whether the service is requested to the terminal.

Third, the MME may distinguish the service according to whether to transmit an emergency. The terminal transmits whether there is the emergency together with at the time of requesting PDN connectivity. Based thereon, the MME may distinguish whether there is an emergency service.

Fourth, the MME may distinguish the service according to allocation and retention priority (ARP) information which is QoS parameters including priority level, aggregate maximum bit rate, pre-emption vulnerability, pre-emption capability, etc.

In addition, in step S8A-20, the MME may determine whether the MME receives the PDN connection request message for the service requested to the terminal before the timer expires. Based thereon, the MME may determine whether the terminal generates the PDN connection.

Since the failure does not occur in the PDN connection when the PDN connection is generated, the MME returns to step S8A-10 again to detect whether the failure occurs in the PDN connection. When the PDN connection is not generated, the process may proceed to step S8A-30 and the timer may expire.

In addition, in step S8A-40, the MME may compare the retry count of trying the reattach by the corresponding terminal and a configuration value of the MME. As a result of the comparison, when the retry count of trying the reattach by the terminal is equal to or less than the configuration value of the MME, the process may proceed to steps S8A-50 and S8A-60.

In step S8A-50, the MME may increase the retry count of trying the reattach by the corresponding terminal by 1. In step S8A-60, the MME may set the detach type as reattach required and transmit the detach request message to the corresponding terminal. The terminal that receives the message may perform the detach procedure.

Then, as the detach type of the message is set to reattach required, the terminal may try the attach to the MME again and request the corresponding PDN connection generation. In this case, the process returns to step S8A-10 again and the MME may detect whether the failure occurs in the PDN connection.

Meanwhile, as the comparison result, when the retry count of trying the reattach by the terminal is larger than the configuration value of the MME, the MME may not transmit the detach request message to the terminal. In this case, the MME may classify the terminal as the terminal in which the PDN connection may not be recovered.

In addition, in step S8A-45, the MME may store the identification information for the corresponding terminal in the storage of the MME. Since it is highly possible that the failure of the PDN connection is due to a defect of the terminal itself rather than a problem of a communication network, the MME may store the identification information to identify the corresponding terminal.

Further, the MME may transmit the identification information to the network operator. The network operator receiving the identification information may identify abnormal terminals. Therefore, the network operator specifies the terminal in which the failure occurs in the PDN connection to take an additional action.

In step S8A-46, the MME may transmit a notification message to the terminal in which the failure occurs in the PDN connection and which is not recovered even by the management method according to an embodiment of the present disclosure. The terminal receiving the message displays the contents of the notification message on a display, thereby notifying the user of the terminal that the failure occurs in the terminal.

Figure 8B:
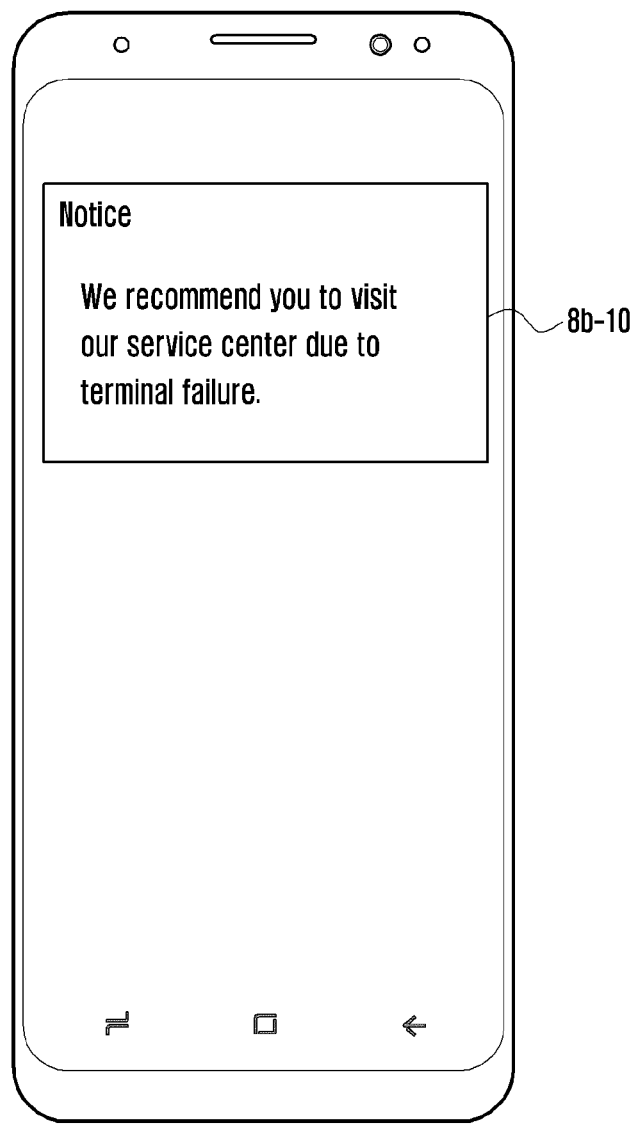
FIG. 8B illustrates a diagram of a notification message transmitted to a terminal in which it is impossible to recover a PDN connection according to an embodiment of the present disclosure.

FIG. 8B illustrates a diagram of a notification message transmitted to a terminal in which it is impossible to recover a PDN connection according to an embodiment of the present disclosure.

FIG. 8B-10 illustrates a message which the terminal receiving the notification message displays on the display. The notification message may be displayed to the user in the form of a pop-up message, SMS, or the like of the communication company application on the display of the terminal. The message content of FIG. 8B-10 is only an example of notifying the user of the terminal, but is not limited to the contents illustrated in the drawing, and may be displayed in various forms.

Meanwhile, hereinafter, it will be described that a third embodiment of a method for providing a corresponding service when a default PDN connection is generated but the PDN connection for the service requested to the terminal may not be generated. The third embodiment may also be applied to a case where the retry count of trying the reattach by the terminal is larger than the configuration value of the MME so that the MME is classified as the terminal that does not transmit the detach request message and may not be recovered. However, the third embodiment is not limited only to the case where the MME is classified as the terminal that may not be recovered and the third embodiment may be applied to a subscriber without determining whether the retry count is exceeded.

The third embodiment may be utilized for recovering the service requested to the terminal. In addition, the third embodiment may be applied even to a case where a plurality of services is recovered. However, in the following description, it is assumed and described that the service requested to the terminal is a voice over LTE (VoLTE) service.

Figure 9:
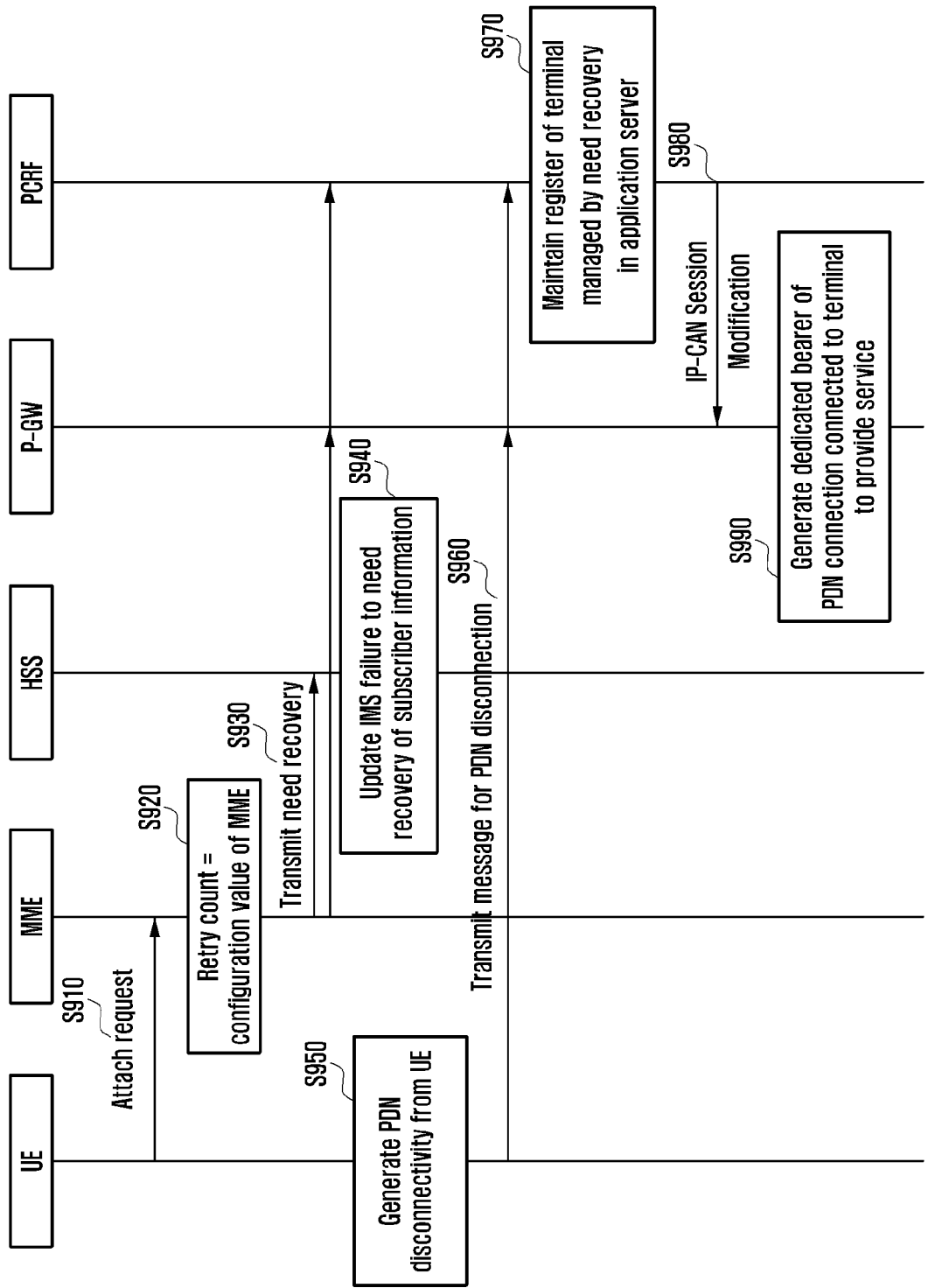
FIG. 9 illustrates a diagram that PCRF provides a service to a terminal through P-GW even though a failure occurs in a PDN connection according to a third embodiment of the present disclosure.

FIG. 9 illustrates a diagram that PCRF provides a service to a terminal through P-GW even though a failure occurs in a PDN connection according to a third embodiment of the present disclosure.

An operation according to the third embodiment of the present disclosure will be briefly described as follows. First, the MME may transmit a terminal in which the failure occurs in a home subscriber server (HSS), a P-GW, and a policy and charging rules function (PCRF) and the type of corresponding service and stores whether the failure occurs and the service type in the subscriber information of the terminal. Thereafter, when PDN Disconnectivity occurs from the terminal, the PCRF does not delete a register of the terminal from an application server and maintains the register. Then, the PCRF transmits a message for dedicated bearer generation to the P-GW. Then, the P-GW may activate a dedicated bearer and provide the service in place of the PDN in which the failure occurs using the dedicated bearer.

The third embodiment of the present disclosure will be described in detail with reference to FIG. 9 and subsequent drawings.

First, in step S910, the terminal in which the failure occurs in the PDN connection may transmit the attach request message to the MME. In step S920, the MME may compare a retry count of trying the reattach by the terminal and a configuration value of the MME. When the retry count of trying the reattach by the terminal is equal to the configuration value of the MME, the process may proceed to step S930 below.

In addition, in step S930, the MME may notify that the failure occurs in the terminal, which is in a "NEED RECOVERY" state to the HSS, the P-GW, and the PCRF. The MME may notify the failure state to the HSS through the Notify Request message and notify the state to the P-GW through the attach procedure message. In addition, the PCRF may receive the failure state through the P-GW. The message for notifying the state of the terminal may include the IMSI, the IMEI, and information for notifying the number and types of services in which the failure occurs and in the case of the third embodiment, the message may include information for notifying that the failure occurs in an IMS PDN connection.

In step S940, the HSS receives the message from the MME and manages the occurrence and type of the failure of the terminal. In the case of the third embodiment, the HSS may newly add the "NEED RECOVERY" parameter to the subscriber information of the terminal in which the failure occurs and update that the failure occurs in the IMS PDN connection.

Thereafter, PDN Disconnectivity may be generated from the terminal in step S950 even when the terminal performs the reattach. In addition, in step S960, the terminal may send a PDN Disconnection Request message to the MME, the MME may send a Delete Session Request message to a serving gateway (SGW) and the P-GW, and the PCRF may receive a message for the PDN disconnection through the P-GW.

In addition, in step S970, when the PCRF receives the message, the PCRF may maintain the register of the terminal managed by "NEED RECOVERY" in the application server serving the terminal according to the received information. The PDN disconnection may be performed from the terminal to the PCRF due to the PDN Disconnectivity generated in step S950, but the PDN disconnection is not performed from the PCRF to the application server, thereby maintaining the register of the terminal.

When an incoming service occurs to the terminal after step S970, the register of the terminal is maintained in the application server, so that the PCRF may receive user data. In step S980, the PCRF may transmit an IP-CAN session modification message to the P-GW. The message may induce the P-GW to generate the dedicated bearer.

In addition, in step S990, the P-GW generates the dedicated bearer to provide the service to the terminal in which the failure occurs in the PDN connection. The P-GW may provide the service to the terminal through the generated dedicated bearing on behalf of the PDN connection in which the failure occurs.

In addition, the P-GW may activate the dedicated bearer even when the default PDN connection connected to the terminal is not the PDN connection for the service. In the case of the third embodiment, the dedicated bearer may perform a voice call service even when the default PDN connection is not the IMS PDN connection.

Further, when there is a plurality of default PDN connections, the PDN connection to activate the dedicated bearer needs to be selected. When there is a plurality of default PDN connections, a PDN connection in which a quality of service (QoS) is high and a remaining aggregated maximum bit rate (AMBR) is high may be selected. A total sum of AMBRs of the dedicated bearers connected to one PDN connection does not exceed total AMBRs allocated to the corresponding PDN connection. Therefore, only when the PDN connection in which the QoS is high and the remaining AMBR is high is selected, the service may be smoothly provided.

When a measure of the third embodiment is not taken, the P-GW may not transmit voice data to the terminal because the P-GW is in a state in which the PDN connection is deleted by an IMS PDN connection disconnectivity procedure even by receiving voice data of the IMS. Since the P-GW may not start the PDN connection connectivity procedure, the P-GW may not send the voice data to the terminal.

On the contrary, when the measure of the third embodiment is taken and incoming VoLTE is generated to the terminal, since the application server does not delete the register of the terminal, the P-GW may receive incoming data. In addition, the P-GW may receive information on the terminal in which the failure occurs in the IMS PDN connection, which is called "NEED RECOVERY" from the MME. In addition, the P-GW may receive a message for generating the dedicated bearer from the PCRF. In addition, the P-GW transmits the incoming data to the terminal through the dedicated bearer to provide the voice service.

That is, when the terminal to which "NEED RECOVERY" is notified receives the voice data, the P-GW may generate the dedicated bearer through a dedicated bearer activation procedure in the PDN connection (even though the PDN connection is not the IMS PDN) of the corresponding terminal.

In addition, the P-GW may provide a voice call service through the dedicated bearer. Although the P-GW may not start the PDN connection connectivity procedure, the P-GW may start the dedicated bearer activation procedure.

The aforementioned PDN connection means a default bearer. The dedicated bearer means a bearer which depends on the default bearer. In the related art, for the VoLTE service, when the P-GW generates the dedicated bearer, the dedicated bearer which depends on the IMS PDN connection may be generated only when there is the IMS PDN connection. Therefore, when there is no IMS PDN connection, the P-GW may not generate the dedicated bearer and the terminal may be in an incoming disable state.

On the contrary, even when there is no IMS PDN connection, the dedicated bearer generated by the dedicated bearer activation procedure in the P-GW due to the measure of the third embodiment may provide the voice call service by a method for generating the dedicated bearer in another PDN (e.g., internet PDN, etc.) connection connected to the terminal. In addition, when a voice call is terminated, the dedicated bearer may be deleted through a dedicated bearer deactivation procedure.

In addition, when there is a plurality of default PDN connections, the P-GW needs to select the PDN connection to activate the dedicated bearer. When there is a plurality of default PDN connections, the PDN connection in which the quality of service (QoS) is high and the remaining aggregated maximum bit rate (AMBR) is high may be selected. A total sum of AMBRSs of the dedicated bearers connected to one PDN connection does not exceed total AMBRs allocated to the corresponding PDN connection. Therefore, only when the P-GW selects the PDN connection in which the QoS is high and the remaining AMBR is high, the P-GW may smoothly provide the service.

Meanwhile, in the third embodiment, the VoLTE service is just described as an example and a service other than the VoLTE service may be adopted. When the MME may update whether a service failure occurs to the subscriber information of the HSS and notify the service failure to an equipment serving as the application server. Since the application server may know whether the PDN failure occurs, the application server may maintain the register of the terminal as described above and recover the service in the same method as the third embodiment of generating the dedicated bearer.

Meanwhile, as mentioned above, a terminal which is used only for the emergency may be described as an example as a case of supporting the third embodiment with respect to all subscribers without determining whether the retry count is exceeded.

When the incoming is not made without emergency PDN, a serious problem may be caused in the terminal used only for the emergency, an Internet of things (IoT) equipment used only for an emergency situation or a mission critical push to talk (MCPTT) equipment needs to continuously maintain emergency PDN or PDN having an MCPTT dedicated QCI. In the above description, the MCPTT may mean communication for public safety (a fire station, a police station, etc.), emergency situations including a nuclear power plant accident, and the like.

In the third embodiment, the MME may transmit PDN connection failure occurrence information to the terminal used only for the emergency without management of the retry count. The service may be provided to emergency terminals by the method by recovering the PDN connection in a similar method as the third embodiment even when there is no corresponding PDN, without management of the retry count.

Figure 10:
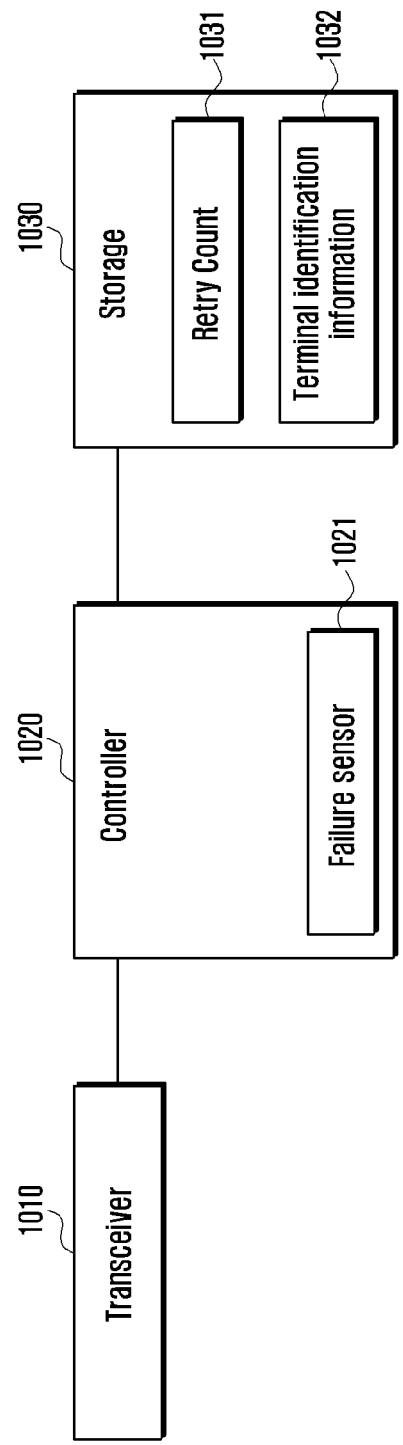
FIG. 10 illustrates a block diagram of an internal structure of an MME according to an embodiment of the present disclosure.

FIG. 10 illustrates a block diagram of an internal structure of an MME according to an embodiment of the present disclosure. As illustrated in FIG. 10, the MME of the present disclosure may include a transceiver 1010, a controller 1020, and a storage 1030.

The transceiver 1010 of the MME performs message transmission and reception between the MME and the terminal or between the MME and the network operators. To this end, the transceiver 1010 may include a wired or wireless interface.

The controller 1020 of the MME may control an overall operation of the MME. In particular, the controller 1020 may further include a PDN connection failure sensor 1021 that detects whether the failure occurs in the PDN connection between the terminal and the PDN.

The failure sensor 1021 may detect whether the failure occurs in the PDN connection by monitoring the PDN connection between the terminal and the PDN. The case where the failure occurs in the PDN connection may include a case where the PDN connection for a service requested to the terminal is not generated or the PDN connection is released after the PDN connection is established and the service requested to the terminal may not be provided.

According to the first embodiment of the present disclosure, when the terminal transmits the attach request to the MME, the PDN connection between the terminal and the PDN may be generated under the control of the MME. When the MME receives the attach request message from the terminal, the MME may start the timer. When the MME may not receive the PDN connection request message for the service requested to the terminal until the timer expires, the failure which occurs in the PDN connection is detected.

According to the second embodiment of the present disclosure, when the terminal transmits the PDN disconnection request to the MME, the PDN connection generated for the terminal may be disconnected. When the PDN connection which is generated and then, disconnected for the terminal is the PDN connection for the service requested to the terminal, the MME may start the timer. When the MME may not receive the PDN connection request message for the service requested to the terminal until the timer expires, the failure which occurs in the PDN connection is detected.

In addition, when the failure is detected in the PDN connection, in the case where the retry count of trying the reattach by the terminal is equal to or less than the configuration value of the MME, the controller 1020 may transmit the detach request message to the corresponding terminal. Meanwhile, the controller 1020 may not transmit the detach request message, but store identification information 1032 of the corresponding terminal in the storage 1030 to be described below when the retry count of trying the reattach by the terminal is larger than the configuration value of the MME.

The storage 1030 of the MME may store information on the terminal connected to the MME according to an embodiment of the present disclosure. According to an embodiment of the present disclosure, the storage 1030 may particularly store a retry count 1031 of trying the reattach by each terminal. Further, the storage 1030 may classify the corresponding terminal as the terminal which may not be recovered and store the identification information 1032 of the terminal when the retry count of trying the reattach by the terminal is larger than the configuration value of the MME. The identification information 1032 for the terminal may be an international mobile equipment identity (IMEI) and an international mobile subscriber identity (IMSI).

Figure 11:
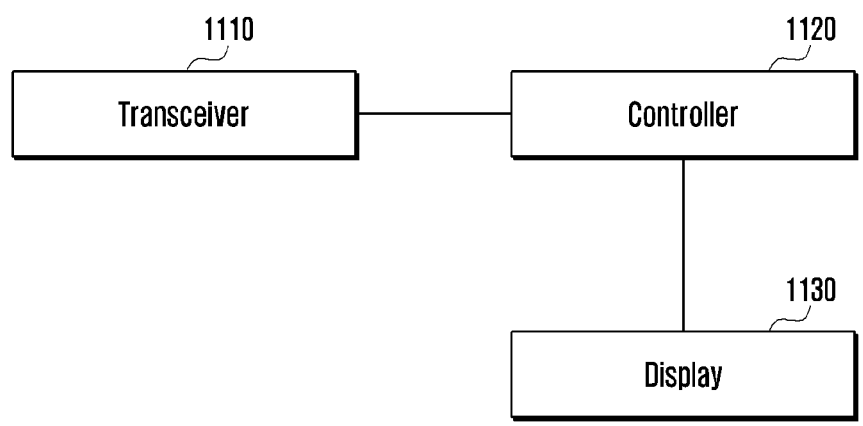
FIG. 11 illustrates a block diagram of an internal structure of a terminal according to an embodiment of the present disclosure.

FIG. 11 illustrates a block diagram of an internal structure of an MME according to an embodiment of the present disclosure. As illustrated in FIG. 11, the terminal of the present disclosure may include a transceiver 1110, a controller 1120, and a display 1130.

The transceiver 1110 of the terminal performs message transmission and reception between the terminal and the MME. To this end, the transceiver 1110 may include a wired or wireless interface.

The controller 1120 of the terminal may perform the detach procedure according to the detach request message received from the MME. According to an embodiment of the present disclosure, as a detach type of the detach request message is set to Reattach Required, the terminal attempts to attach to the MME again and requests the corresponding PDN connection generation. Meanwhile, when the retry count of trying the reattach by the terminal is larger than the configuration value of the MME, the terminal may not perform the detach and attach procedures.

When the display 1130 of the terminal receives the notification message from the MME, the display 1130 may display the notification message on terminal in order to notify the notification message to the user of the terminal. The display 1130 may notify to the user of the terminal that the user may not receive the corresponding service due to the failure in the PDN connection. Thereafter, a purpose thereof is to induce the user of the terminal to check the terminal.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing a packet data network (PDN) connection of a node in a wireless communication system, the method comprising:
    detecting, by the node, a terminal in which a failure occurs in establishing a PDN connection;
    comparing a retry count of trying reattach by the terminal in which the failure occurs and a configuration value of the node; and
    in case that the retry count of trying the reattach by the terminal in which the failure occurs is equal to or less than the configuration value of the node:
        increasing, by the node, the retry count of trying the reattach by the terminal,
        setting, by the node, a detach type of a detach request message to reattach required, and
        transmitting to the terminal, by the node, the detach request message,
    in case that the retry count of trying the reattach by the terminal in which the failure occurs is larger than the configuration value of the node, transmitting, by the node, identification information for the terminal to a network operator.

2. The method of claim 1,
    wherein detecting the terminal comprises determining a terminal that does not transmit a PDN connection request message as the terminal in which the failure in establishing the PDN connection occurs, and
    wherein transmitting the detach request message comprises transmitting a detach request message including information for reattach of the terminal.

3. The method of claim 1, wherein detecting the terminal further comprises:
    starting a timer of the node when the node receives an attach request message from the terminal; and
    determining the terminal as a management target terminal when the node does not receive a PDN connection request message for a service from the terminal until the timer expires,
    wherein the service is requested to the management target terminal.

4. The method of claim 1, wherein detecting the terminal further comprises:
    starting a timer of the node when the terminal requests PDN disconnection and a disconnected PDN connection is the PDN connection for a service requested to the terminal; and
    determining the terminal as a management target terminal when a PDN connection request message for the service requested to the management target terminal is not transmitted from the terminal until the timer expires.

5. The method of claim 1, further comprising:
    storing, by the node, the identification information for the terminal in a storage of the node in case that the retry count of trying the reattach by the terminal in which the failure occurs is larger than the configuration value of the node.

6. The method of claim 1, further comprising transmitting, by the node, a notification message to the terminal in case that the retry count of trying the reattach by the terminal in which the failure occurs is larger than the configuration value of the node.

7. A node for managing a packet data network (PDN) connection in a wireless communication system, the node comprising:
    a transceiver configured to transmit and receive information on a PDN connection to and from a terminal;
    a controller operably connected to the transceiver, the controller configured to:
        detect a terminal in which a failure occurs in establishing the PDN connection by the node;
        compare a retry count of trying a reattach by the terminal in which the failure occurs and a configuration value of the node,
        in case that the retry count of trying the reattach by the terminal in which the failure occurs is equal to or less than the configuration value of the node:
            increase, by the node, the retry count of trying the reattach by the terminal,
            set a detach type of a detach request message to reattach required, by the terminal, and
            transmit the detach request message, and
        in case that the retry count of trying reattach by the terminal in which the failure occurs is larger than the configuration value of the node, transmit identification information for the terminal to a network operator; and
    a storage operably connected to the controller, the storage configured to store information on the terminal in which the failure occurs and the retry count of trying reattach by the terminal in the node.

8. The node of claim 7, wherein the controller is further configured to:
    determine a terminal that does not transmit a PDN connection request message as the terminal in which the failure in establishing the PDN connection occurs; and
    transmit the detach request message including information for reattach of the terminal.

9. The node of claim 7, wherein the controller is further configured to:
    start a timer of the node when the node receives an attach request message from the terminal; and
    determine the terminal as a management target terminal when the node does not receive a PDN connection request message for a service from the terminal until the timer expires,
    wherein the service is requested to the management target terminal.

10. The node of claim 7, wherein the controller is further configured to:
    start a timer in the node when the terminal requests PDN disconnection and a disconnected PDN connection is the PDN connection for a service requested to the terminal; and
    determine the terminal as a management target terminal when not transmitting a PDN connection request message for the service requested to the management target terminal from the terminal until the timer expires.

11. The node of claim 7, wherein the controller is further configured to:
    transmit, by the node, a notification message to the terminal in case that the retry count of trying the reattach by the terminal in which the failure occurs is larger than the configuration value of the node.

12. The node of claim 7, wherein the storage is further configured to
    store, by the node, the identification information for the terminal in a storage of the node in case that the retry count of trying the reattach by the terminal in which the failure occurs is larger than the configuration value of the node.

13. A method for managing a packet data network (PDN) connection of a terminal in a wireless communication system, the method comprising:
receiving, from a node, a detach request message from a node in response to detecting, by the node, that a failure has occurred in the terminal in establishing a PDN connection;
performing, by the terminal, detach; and
attaching the terminal,
wherein a retry count of trying reattach by the terminal in which the failure occurs and a configuration value of the node is compared by the node, and
wherein, in case that the retry count of trying the reattach by the terminal is equal to or less than the configuration value of the node, the retry count of trying the reattach by the terminal is increased and a detach type of a detach request message is set to reattach required by the node, and
wherein, in case that the retry count of trying reattach by the terminal in which the failure occurs is larger than the configuration value of the node, identification information for the terminal is transmitted from the node to a network operator.

14. The method of claim 13, further comprising,
in case that the terminal receives a notification message from the node, displaying the notification message on a display of the terminal.

15. A terminal for managing a packet data network (PDN) connection in a wireless communication system, the terminal comprising:
a transceiver configured to transmit and receive information on a PDN connection management to and from a node; and
a controller operably connected to the transceiver, the controller configured to:
receive a detach request message from the node by the terminal in response to detecting, by the node, that a failure has occurred in the terminal in establishing a PDN connection, and
perform detach and attach,
wherein a retry count of trying reattach by the terminal in which the failure occurs and a configuration value of the node is compared by the node,
wherein, in case that the retry count of trying the reattach by the terminal is equal to or less than the configuration value of the node, the retry count of trying the reattach by the terminal is increased and a detach type of a detach request message is set to reattach required by the node, and
wherein, in case that the retry count of trying reattach by the terminal in which the failure occurs is larger than the configuration value of the node, identification information for the terminal is transmitted from the node to a network operator.

16. The terminal of claim 15, further comprising a display operably connected to the controller, the display configured to display a notification message received from the node.

* * * * *